US012359003B2

(12) United States Patent
O'Connor et al.

(10) Patent No.: US 12,359,003 B2
(45) Date of Patent: Jul. 15, 2025

(54) METHOD FOR THE PREPARATION OF MICRO OR NANO CRYSTALLINE CELLULOSE

(71) Applicant: CELLICON B.V., Hoevelaken (NL)

(72) Inventors: Paul O'Connor, Hoevelaken (NL); Igor Babich, Hagestein (NL); Jacobus Johannes Leonardus Heinerman, Vinkeveen (NL)

(73) Assignee: CELLICON B.V., Hoevelaken (NL)

( * ) Notice: Subject to any disclaimer, the term of this patent is extended or adjusted under 35 U.S.C. 154(b) by 867 days.

(21) Appl. No.: 17/604,076

(22) PCT Filed: Apr. 17, 2020

(86) PCT No.: PCT/EP2020/060933
§ 371 (c)(1),
(2) Date: Oct. 15, 2021

(87) PCT Pub. No.: WO2020/212616
PCT Pub. Date: Oct. 22, 2020

(65) Prior Publication Data
US 2022/0204651 A1   Jun. 30, 2022

(30) Foreign Application Priority Data
Apr. 17, 2019   (EP) .................................... 19169838

(51) Int. Cl.
*C08B 15/08* (2006.01)
*A23L 33/125* (2016.01)
(Continued)

(52) U.S. Cl.
CPC ............ *C08B 15/08* (2013.01); *A23L 33/125* (2016.08); *C08B 15/02* (2013.01); *C08L 1/04* (2013.01); *A23V 2002/00* (2013.01)

(58) Field of Classification Search
None
See application file for complete search history.

(56) References Cited

U.S. PATENT DOCUMENTS

| 2003/0001818 A1 | 1/2003 | Katagiri et al. |
| 2015/0029746 A1 | 1/2015 | Campbell |
(Continued)

FOREIGN PATENT DOCUMENTS

| CN | 102093484 B | 11/2012 |
| CN | 102433786 B | * 4/2014 |
(Continued)

OTHER PUBLICATIONS

Does kraft liquor have a XRD type I structure? (Year: 2025).*
(Continued)

*Primary Examiner* — Peter A Salamon
(74) *Attorney, Agent, or Firm* — HOYNG ROKH MONEGIER B.V.; David P. Owen (57) ABSTRACT

The invention relates to a method for the preparation of micro- or nano crystalline cellulosic compositions from virgin cellulose containing amorphous and crystalline cellulose phases comprising the following steps: (A) contacting virgin cellulose with a first solvent, characterized in that the first solvent is an aqueous solution comprising 40-65 wt. % $ZnCl_2$ in water, relative to the total weight of the of $ZnCl_2$ and water, (B) dissolving the amorphous cellulosic phase, whereby the amorphous cellulosic phase is preferentially dissolved over the crystalline cellulosic phase, (C) separating the dissolved amorphous cellulose from the crystalline cellulose and preferably step C wherein the obtained micro- or nanocellulose has XRD type I structure, which then can be contacted with a second solvent comprising between 65 and 90 wt. % $ZnCl_2$ in water to produce delaminated cellulose having XRD type II structure. The invention also relates to micro- or nano crystalline cellulose having an
(Continued)

XRD type I structure and nano crystalline cellulose having an XRD type II structure or mixtures thereof of high crystallinity and purity and the uses thereof.

19 Claims, 5 Drawing Sheets (51) Int. Cl.
C08B 15/02 (2006.01)
C08L 1/04 (2006.01)

(56) References Cited

U.S. PATENT DOCUMENTS

| 2021/0021074 A1 | 1/2021 | Fuchs et al. |
| 2021/0022621 A1 | 1/2021 | Sullivan et al. |

FOREIGN PATENT DOCUMENTS

| EP | 3567057 A1 | 11/2019 |
| EP | 3777565 A1 | 2/2021 |
| JP | 2002-20401 A | 1/2002 |
| JP | 2019-16456 A | 1/2019 |
| JP | 2019-16457 A | 1/2019 |
| JP | 2019-201635 A | 11/2019 |
| JP | 2019-202930 A | 11/2019 |
| RU | 2580746 C2 | 7/2014 |
| WO | 2009021687 A1 | 2/2009 |
| WO | 2014/088034 A1 | 6/2014 |
| WO | 2019/194085 A1 | 10/2019 |

OTHER PUBLICATIONS

Tan Xiao Yun et al: "Preparation of high crystallinity cellulose nanocrystals (CNCs) by ionic liquid solvolysis", Biomass and Bioenergy, Pergamon, Amsterdam, NL, vol. 81, Aug. 29, 2015 (Aug. 29, 2015), pp. 584-591, XP029269229.
Xiao Yun Tan et al, Preparation of high crystallinity cellulose nanocrystals (CNCs) by ionic liquid solvolysis, Biomass and Bioenergy, 2015, 81, pp. 584-591.
Yongjun Highly ordered cellulose II crystalline regenerated from cellulose hydrolyzed by 1-butyl-3-methylimidazolium chloride, Carbohydrate Polymers, 2016, 137, p. 321-327.

* cited by examiner

METHOD FOR THE PREPARATION OF MICRO OR NANO CRYSTALLINE CELLULOSE

BACKGROUND OF THE INVENTION

1. Field of the Invention

The invention relates to a method for the preparation of micro- or nano crystalline cellulose having high crystallinity. The invention also relates to micro- or nano crystalline cellulose having high crystallinity and mixtures thereof and to the use thereof.

2. Description of the Related Art

Cellulose is the most abundant natural polymer in nature and is one of the most promising polymeric resources, which is renewable, bio-degradable, and biocompatible. However, chemical processing of cellulose is extremely difficult in general because it is neither melt-able nor soluble in water or common solvents due to its partially crystalline structure and close chain packing via numerous inter- and intra-molecular hydrogen bonds.

Over the past decades, several cellulose solvent systems have been available for dissolving or reacting cellulose, such as viscose process (CS2), LiCl/N,N-dimethylacetamide (DMAc), DMSO/paraformaldehyde (PF), and some aqueous solutions of metal complexes.

However, these conventional cellulose solvent systems have disadvantages, such as limited dissolving capability, toxicity, high cost, solvents recovery, uncontrollable side reactions, and instability during cellulose processing and/or derivatization.

The Lyocell process, which uses N-Methyl-Morpholine N-oxide (NMMO) to dissolve cellulose directly, also has some disadvantages including the formation of byproducts, the degradation of cellulose and high cost.

In recent years, an alternative method for dissolution of cellulose in NaOH/urea aqueous solution has been developed, in which the cellulose can be dissolved and pre-cooled to −12° C. within 2 min. However, the dissolution process is limited in terms of cellulose concentration and degree of polymerization (DOP).

Recently, ionic liquids (ILs) have attracted much attention due to their high electrochemical and thermal stability, non-flammability, and tunable solubility properties. Ionic liquids are often fluid at room temperature and consist entirely of ionic species and represent a new class of solvents with high polarity. Since no toxic or explosive gases are formed due to their low vapor pressure, ionic liquids are considered as "green solvents." Moreover, ionic liquids exhibit outstanding dissolving capability for cellulose, which will broaden the comprehensive utilization for cellulose. From these solutions, after precipitation and/or coagulation, shaped materials can be formed exhibiting good physical strength, such as threads, fibers, sheets, films, particles etc.

Ioelovich and Leykin reported in Research Journal of Nanoscience and Engineering Volume 2, Issue 4, 2018, PP 10-13 describe a process for preparation of micro- or nanocrystalline cellulose compositions comprising the contacting of virgin cellulose with concentrated acid and subsequent mechanical treatment.

Ioelovich and Leykin, in Cellulose Chemistry and Technology, 40 (5), 2006, 313-317, describe a process comprising the treatment of cellulose with dilute boiling sulphuric acid and subsequent sonication.

Tan et al., in Biomass and Bioenergy 81 (2015) 584-591, describe a process for preparation of nanocrystalline cellulose compositions comprising contacting virgin cellulose with ionic liquid 1-butyl-3-methylimidazoliun hydrogen sulfate (BmimHSO4) as a solvent.

A disadvantage of the mentioned prior art processes is that they use exotic solvents that are very expensive and require a very long time to complete the reaction. The Bmim ionic liquids of Tan and the acids of Ioelovich require longer time up to 10 hours. Enzymatic routes even take longer; up to 20 to 40 hours.

WO2017/055407 describes that improved properties can be obtained from nano-crystalline cellulose composition obtained in a process wherein virgin cellulose is not dissolved but delaminated in ionic liquid such as hydrated Zinc Chloride.

CN102433786 describes a method for preparing micro-nanocellulose by mechanical force chemical method, which is obtained by mixing and grinding in a solution which can be a salt solution of Zinc Chloride.

CN102093484 describes a method for preparing for preparing nanocrystalline cellulose by dissociating cellulose raw material in Zinc Chloride solution and dispersing in a high-speed homogeneous manner under heating conditions and adding diluted acid to the to precipitate and subjecting to ultrasonic dispersion treatment or wet milling to obtain nanocrystalline cellulose.

A disadvantage of the prior art processes is that do not result in high crystallinity and high purity micro- or nano-cellulose. In the dissolution of cellulose, amorphous materials and oligomers with a poor aspect ratio and low degree of polymerization which are present in the virgin cellulose, are also dissolved and partly precipitated during the formation of the regenerated cellulose and subsequent shaping steps. This may lead to poorer properties like chemical stability, and mechanical properties of the obtained product.

The prior art dissolution processes may also lead to an irreversible transformation of the Cellulose XRD type I crystal structure to Cellulose XRD type II which is not desirable in view of physical properties of the obtained cellulose product in certain applications (e.g. High-quality fibers).

A problem underlying the invention is to provide a process that does not have at least one of the aforementioned disadvantages, in particular a process that is less complicated and less expensive and results in a cellulose product that has improved properties, in particular high crystallinity and purity.

BRIEF SUMMARY OF THE INVENTION

The present invention addresses these problems by providing a method for the preparation of micro- or nano crystalline cellulose from virgin cellulose containing amorphous and crystalline cellulose phases comprising the following steps:

(A) contacting virgin cellulose with a first solvent, characterized in that the first solvent is an aqueous solution comprising 40-65 wt. %, preferably 40-60 wt. %, more preferably 40-55 wt. % $ZnCl_2$ in water relative to the total weight of the of $ZnCl_2$ and water wherein preferably the amount of virgin cellulose is between 1 and 10 wt. % of the amount of the first solvent, (B) dissolving the amorphous cellulose phase, whereby the amorphous cellulose phase is preferentially dissolved over the crystalline cellulose phase, (C) separating the dissolved amorphous cellulose from the crystalline cellulose.

In the process, the content of amorphous materials in the native cellulose (non-crystalline and oligomers) can be reduced whilst avoiding affecting the integrity and crystal structure of the cellulose. The method can be operated at relatively low temperatures and is relatively fast and therefore cost-effective and is also an environmentally friendly method to produce micro-cellulose and/or nano cellulose materials and more particularly to such micro- and nano cellulose materials with a higher purity and crystallinity (XRD) and higher overall content of crystals exhibiting a higher average degree of polymerization (DOP) and high average aspect ratio. This results in improved physical properties of the resulting cellulose product.

DETAILED DESCRIPTION OF THE INVENTION

Figure 1:
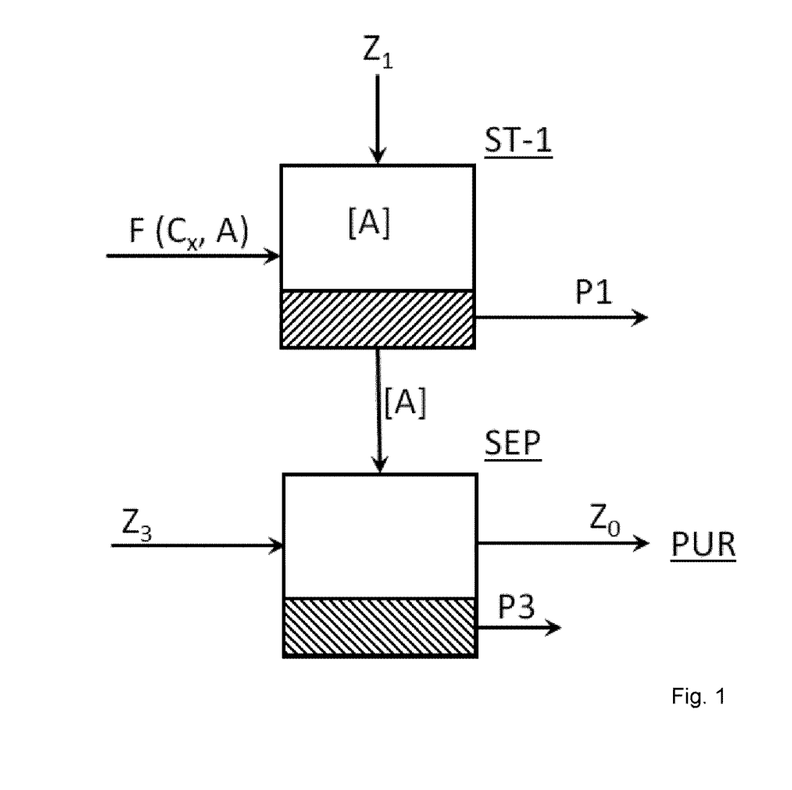
FIG. 1 is a schematic drawing of a process according to the invention comprising a first step ST-1 wherein a cellulose containing feed F comprising crystalline cellulose Cx and amorphous cellulose A is contacted with a first solvent Z1, producing a product stream P1 comprising highly crystalline Cellulose XRD type I and dissolved amorphous product stream [A], which is subjected to a separation step SEP comprising adding Anti-Solvent Z3 resulting in a product stream P3 comprising precipitate comprising (poly-) sugars in particular sugar monomers and oligomers (e.g. Glucose and C6-Oligomers) and a used solvent stream $Z_0$ which is sent to solvent purification/concentration step PUR.

In the method according to the invention the virgin cellulose is contacted in step A (step ST-1 indicated in FIG. 1) with a first solvent characterized in that the first solvent is an aqueous solution comprising 40-65 wt. %, preferably 40-60 wt. %, more preferably 40-55 wt. % $ZnCl_2$ in water relative to the total weight of the of $ZnCl_2$ and water.

The first solvent is a $ZnCl_2$ based molten salt diluted with water resulting in a mild solvent that is able to effectively and preferentially dissolve the amorphous phase, meaning that the dissolution can be achieved in relatively short time without substantially dissolving the crystalline phase. With hydrated inorganic molten salt is meant a salt that has, in undiluted form, a melting temperature below 100° C. The hydrated molten salt preferably is $ZnCl_2 \cdot nH_2O$ with n=2-6, preferably n=4, which is relatively inexpensive and very effective. This is diluted such that the diluted aqueous solution comprises 40-65 wt. % $ZnCl_2$ in water. For example, $ZnCl_2 \cdot 4H_2O$ can be diluted with 20 or 30 wt. % water to form a solvent comprising 52.4 and 45.8 wt. % $ZnCl_2$ The required $ZnCl_2$ concentration can also be obtained by adding concentrated $ZnCl_2$ to a recycled more diluted $ZnCl_2$ solution. A higher concentration is advantageous in speeding up the dissolution of the amorphous cellulose phase, but the concentration should not exceed 65 wt. % Virgin cellulose has an XRD type I crystal structure. It was found that, as a result of the first solvent having the relatively low $ZnCl_2$ concentration below 65 wt. %, the XRD type I crystal structure of the virgin cellulose is maintained, but the crystallinity can be improved by selective removal of the amorphous phase. At $ZnCl_2$ concentration above about 65 wt. % a transition from XRD type I crystal structure to XRD type II crystal structure was observed.

Virgin cellulose means cellulose that has XRD type I crystal structure as found in biomass. It can be very pure virgin cellulose like Cotton linter, but it can also be in less pure biobased material. The virgin cellulose may be contained in biomass further comprising lignin and/or hemicellulose. Then the biomass comprising virgin cellulose and lignin and/or hemicellulose is contacted with the first solvent and further treated as described below.

The virgin cellulose originating from biomass may contain free water. The free water in the biomass feedstock must be taken into account as well in the amount of water in the $ZnCl_2$ solvent as specified herein. So, a free water containing biomass can be contacted with a more concentrated $ZnCl_2$ solution, but the $ZnCl_2$ concentration in water, including the water in the biomass, should not exceed 65 wt. %. Drying of the biomass is done if the water content in the biomass is too high to allow to get proper $ZnCl_2$ concentration. The drying is typically done at about 120° C. until a residual amount of up to 7, preferably up to 5 wt. % free water is achieved.

The amount of virgin cellulose in the first solution is typically and preferably between 1 and 10 wt. %, preferably between 2 and 9 wt. % more preferably between 3 and 8 wt. % of the amount of first solvent. High amounts of cellulose are generally preferred in view of productivity, but a too high amount may result in too viscous solutions that are difficult to handle for example for separation of precipitated cellulose crystals. When using biomass comprising cellulose and hemicellulose and/or lignin, the amount of biomass contacted with the first solvent in step A is preferably chosen such that the amount of virgin cellulose therein is between 1 and 10 wt. %.

The term preferential dissolution in step B means that substantially more cellulose from the amorphous phase is dissolved than of the crystalline phase. The crystalline phase preferably is substantially not dissolved and preferably more than 70, 80, 85 or even 90% of the virgin cellulose XRD crystallinity is retained. The dissolution of crystalline cellulose is prevented by more dilution of the solvent, relatively lower temperatures, quenching and/or the addition of proton scavengers.

It is preferred that in the method the temperature in step B is below 80° C., preferably below 70, 60 or even 50° C. Lower temperature presents milder conditions and increasing preference for dissolving only the amorphous phase but also increase the time needed to completion. Typically, higher concentration of $ZnCl_2$ is preferably combined with lower temperatures or visa-versa, lower concentration of $ZnCl_2$ can be combined with higher temperatures. Alternatively, it may be preferred that contacting step A is done at higher temperatures, for example between 50 and 80° C. followed by quenching after a pre-determined optimum contacting time to prevent further dissolution of the crystalline cellulose. Quenching meant quickly lowering the temperature. An alternative or additional measure is quick dilution with water.

It is further preferred that the first solvent is free of proton acid and preferably also comprises a proton scavenger. It was found that the absence of proton acid and presence of a proton scavenger prevents lowering of the degree of polymerisation and prevents conversion to type II crystals in the resulting product and/or allows for using higher temperature and higher concentration of the salt. Suitable proton scavengers include the oxides and hydroxides of alkali metals and alkaline earth metals, and the oxides and hydroxides of non-noble transition metals. It is desirable to use the oxide or hydroxide of the corresponding molten salt. For example, as a hydrate of zinc chloride is used as the inorganic molten salt, preferred proton-scavengers are ZnO and $Zn(OH)_2$. It is noted that when proton scavenger, preferably ZnO or $Zn(OH)_2$ is added it may convert in contact with the $ZnCl_2$ solution, so the term solution comprising proton scavenger is meant to cover also solution wherein proton scavenger has been added.

The micro- or nano crystalline cellulose obtained in step B or step C comprises cellulose having XRD type I structure and has a higher purity and higher XRD crystallinity then the initial virgin cellulose material. The cellulose obtained in step B comprises predominantly Cellulose XRD type I structure. Herein, the term predominantly means that at least 50, 60, 70 80, 85 or ideally even 90%. Preferably, the XRD crystallinity of the obtained crystalline cellulose is at least 5, preferably at least 10% higher than of the virgin cellulose and more preferably the XRD crystallinity of the obtained crystalline cellulose is at least 85%, preferably at least 90%. The obtained product is a useful product i.a. for production of fibers or sheets or for use in coatings or as filler. It is noted that herein the term micro- or nanocellulose is used for the product obtained from step 1 and the term nano-cellulose is used for the product obtained from step 2. The cellulose crystals of XRD type I structure obtained in step 1 can also have a size in the nano-range and are in the literature sometimes also referred to both as micro-cellulose and as nano-cellulose.

Size and shape of the cellulose particles, in particular the aspect ratio AR, can be investigated by scanning electron microscopy. The XRD crystallinity degree of the samples can be determined by the method of X-ray diffraction as described below. The average degree of polymerization DP can be measured by the viscosity method using diluted solutions of cellulose in Cadoxen. Description of the mentioned measurements methods can be found in the referenced documents described in Research Journal of Nanoscience and engineering Vol 2, Issue 4, 2018, PP 10-13 (M. Ioelovich).

Preferably, the method further comprises a step E (step SEP in FIG. 1) wherein a coagulation agent is added to the dissolved amorphous cellulose obtained in step C to precipitate the amorphous cellulose, optionally and preferably followed by separating the precipitated amorphous cellulose. This separated product contains poly-sugars comprising oligomers and monomers sugars, including C6 and optionally also C5 sugar oligomers and monomers. The invention also relates to a poly-sugar product comprising oligomer and monomer sugars prepared from the precipitate of the dissolved amorphous cellulose obtained in the process step E. This poly-sugar product can be used as prebiotic food additive.

Suitable coagulation agents are antisolvents; in particular C1 to C8 alcohols and ketones can be used, in particular the alcohols of the group of straight chain and branched chain C1 to C4 alcohols, such as methanol, ethanol, propanol, and iso-propanol. Particularly suitable ketones include the C3 to C5 ketones such as acetone and methylethylketone (MEK). Preferred coagulation agents are acetone, ethanol, t-butyl alcohol. Solid separation and washing can be performed either by centrifugation or by filtration. Cold water can also be used, which is effective in precipitating poly-sugars but not so effective in completely precipitating small poly-sugars and sugar monomers.

Figure 2:
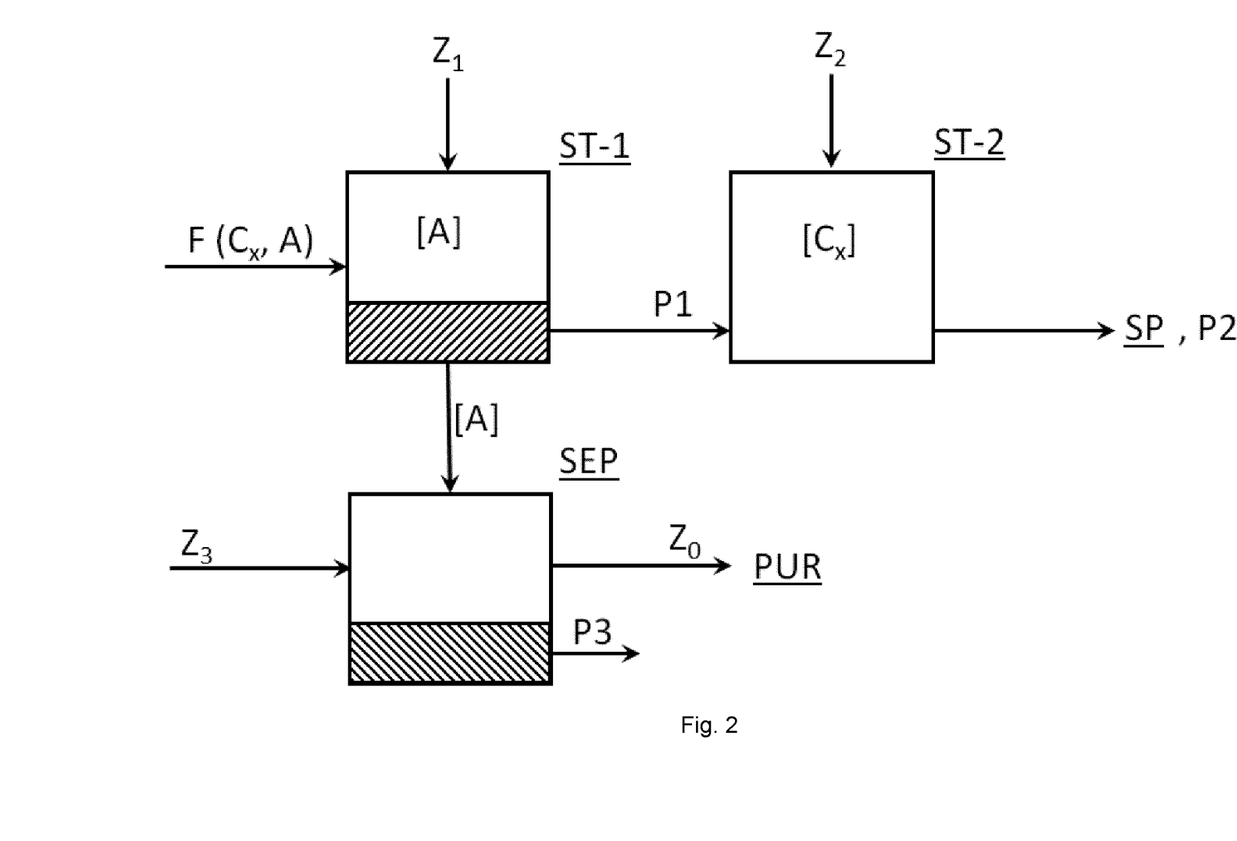
FIG. 2 is a schematic drawing of a second process embodiment, wherein the product stream P1 in the process described in FIG. 1a is contacted with a second solvent Z2, producing a product stream [Cx] comprising dissolved cellulose. The dissolved cellulose stream [Cx] can subsequently be subjected to a shaping or particle formation step SP and a precipitation step to produce High XRD Cellulose type II (product P2) before, during or after the shaping step SP.
Figure 3:
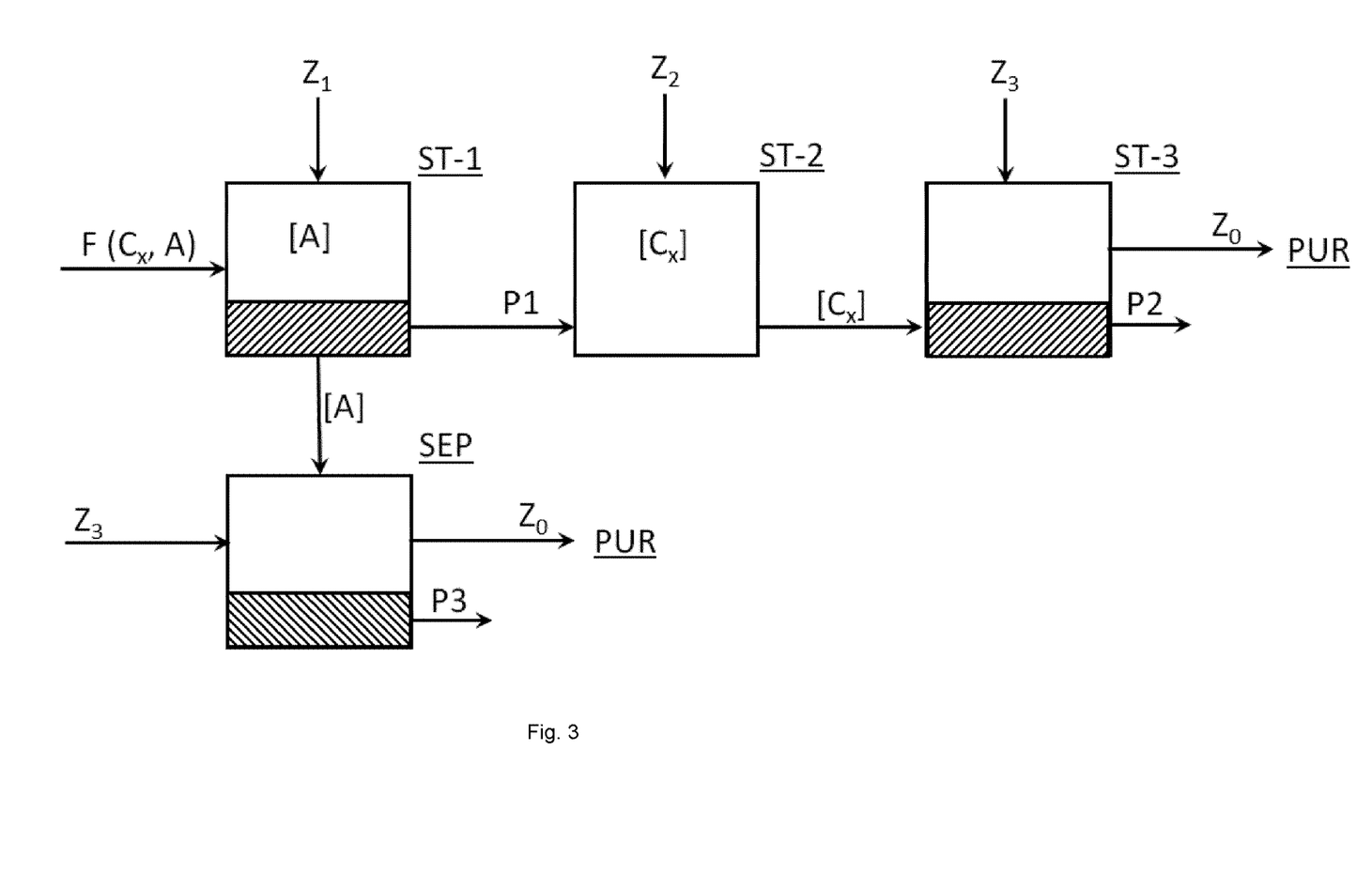
FIG. 3 is a schematic drawing of a third process embodiment, wherein a third process step ST-3 is added to the process described in FIG. 2, wherein dissoluted cellulose product stream [Cx] is contacted with Anti-solvent Z3, resulting in product stream P2 comprising precipitated High XRD Cellulose Type II and a used solvent stream Z0, which is sent to solvent purification in step PUR.
Figure 4:
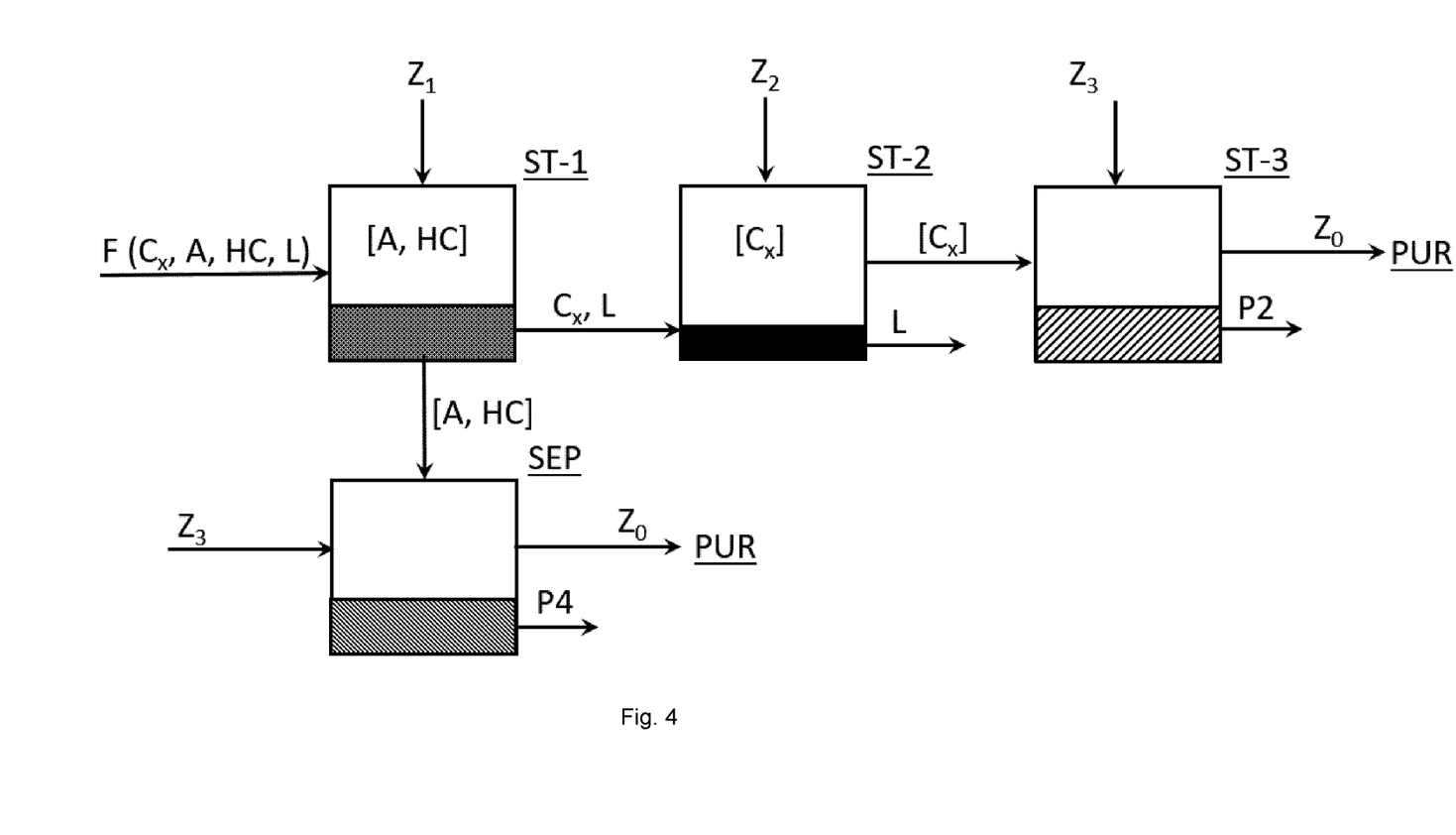
FIG. 4 is a schematic drawing of a fourth process embodiment, wherein feedstock F comprises crystalline cellulose Cx, amorphous cellulose A, hemicellulose HC and lignin L. With this feed, ST-1 results in a product stream [Cx,L] comprising undissolved crystalline cellulose Cx type I and lignin L and a product stream [A, HC] comprising dissolved amorphous cellulose A and hemicellulose HC. The product stream [A, HC] is subjected to a separation step SEP by adding antisolvent Z3, resulting in product stream P4, comprising Xylose, C5-Oligomers, Glucose and C6-Oligomers and used solvent Z0 is sent to PUR. Product stream [Cx,L] is contacted in step ST-2 with second solvent Z2, resulting in dissoluted crystalline cellulose [Cx] and undissolved lignin L. In ST-3, dissolved the dissoluted crystalline cellulose Cx is contacted with antisolvent Z3, resulting in a product stream P2 comprising High XRD Cellulose II and used solved Z0, which is sent to PUR.
Figure 5:
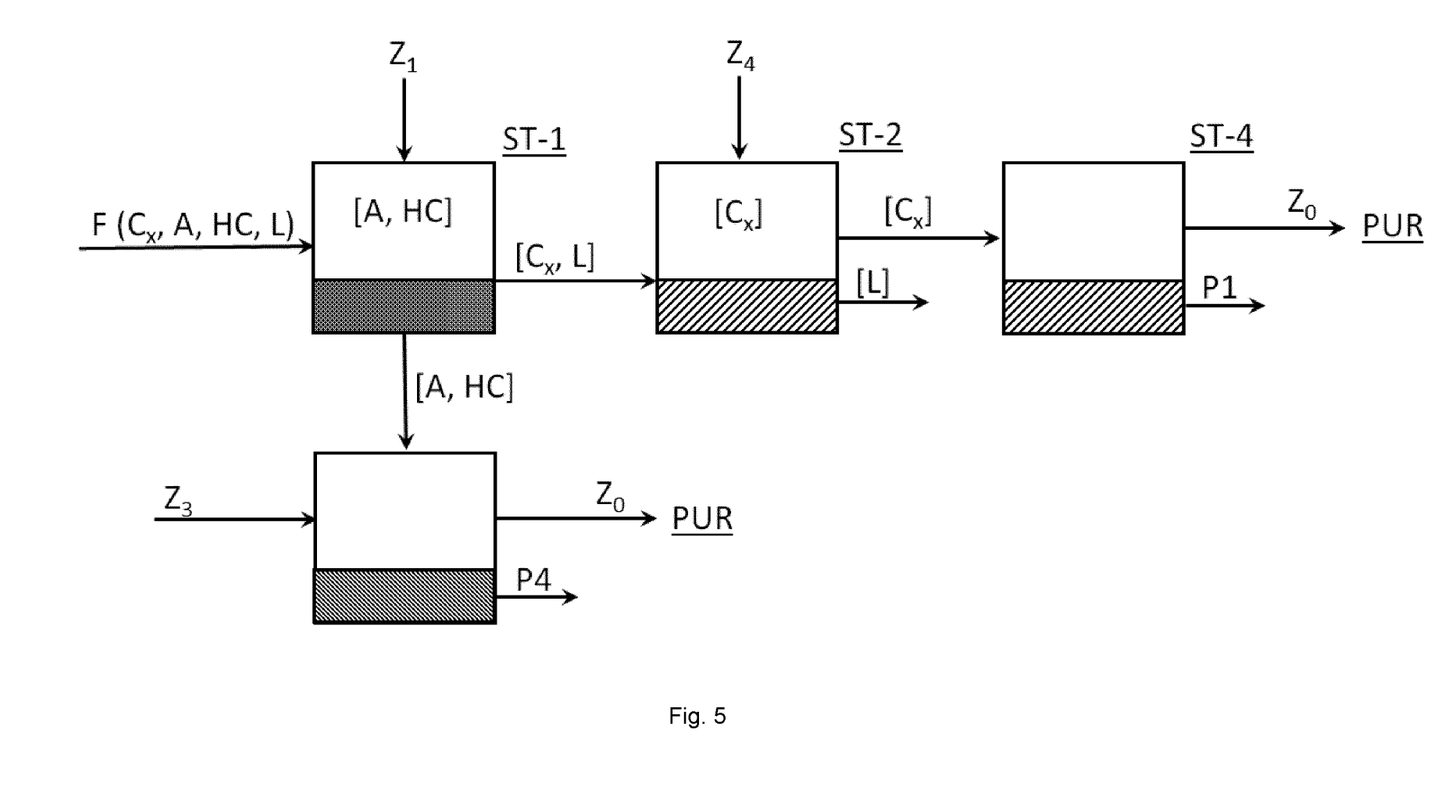
FIG. 5 is a schematic drawing of a fifth process embodiment process, wherein in the process described in FIG. 4A in step ST-2 basic solvent Z4 (for example NaOH, KOH) is used instead of second solvent Z2 producing separated phases of dissolved lignin [L] and dissolved crystalline cellulose [Cx]. Dissolved lignin [L] can be separated and the product stream comprising dissolved cellulose [Cx] is converted in a next step to product stream P1 comprising High XRD Cellulose I.

As described the micro- or nanocrystals obtained in step 1 are useful on itself but can also be used as starting material in a subsequent step 2 to produce nano cellulose having XRD type II structure having a very high purity and high crystallinity. In this alternative embodiment, the method comprises a further step D (step ST-2 indicated in FIG. 2) wherein the crystalline cellulose obtained in step C is contacted with a second solvent comprising between 65 and 90 wt. %, preferably between 70 and 85 wt. % $ZnCl_2$ in water, preferably a molten salt hydrate $ZnCl_2 \cdot nH_2O$ wherein n=1-4, which second solvent is preferably free of proton acid and most preferably also comprises a proton scavenger as described above, preferably ZnO or $Zn(OH)_2$.

In step D, the second solvent has higher dissolution power, i.e. is stronger, than the first solvent because of the higher concentration of $ZnCl_2$. It is believed that micro-cellulose XRD type I structure is a micro-crystalline structure comprising a stack of layers and a low aspect ratio, which layers in step D are delaminated to form nanocellulose crystals having a high aspect ratio. The delaminated cellulose obtained in step D comprises, and preferably predominantly comprises, cellulose having an XRD type II structure. The nano cellulose having XRD type II can advantageously be used for example in paper coatings. The advantage of the process of the invention over the process of WO2017/055407 is that it produces Nano cellulose XRD type II with a higher purity and higher crystallinity leading to better mechanical properties and chemical stability.

During contacting with the second solvent, delamination takes place whilst minimizing hydrolysis to sugars and low DP oligomers and minimizing dissolving of the cellulose nanocrystals. Hydrolysis of cellulose is preferably minimized because it results in formation of sugars and low DP oligomers and shaped articles from such composition results in poorer properties and may cause a brownish colour as a result of degradation. Therefore, acid free second solvent and most preferably also a proton scavenger is used. Nevertheless, also when using acid free solvent with proton scavenger care must be taken to prevent dissolution and hydrolysis of the cellulose by appropriately choosing the salt concentration in the second solvent, the contacting temperature and contacting time such that delamination is achieved whilst minimizing dissolving the cellulose. Contacting with the second solvent may be done at higher temperatures, for example about 70° C., but then quenching must be done after a pre-determined optimum contacting time to prevent dissolving and/or hydrolysis of the crystalline type II nanocellulose.

After dissolution of the Type I cellulose in the second solvent, a clear liquid is formed of dissoluted delaminated type II nanocrystals. The dissoluted delaminated type II nanocrystals are preferably precipitated by adding an antisolvent. Preferably, water is used as antisolvent and is preferably added in an amount to dilute the $ZnCl_2$ concentration to a concentration between 10 and 30 wt. %, preferably between 15 and 25 wt. % and most preferably around 20 wt. %. Preferably, water is added to dilute to a concentration of at least 10, preferably at least 15 wt. % to avoid the precipitation of dissolved sugar oligomers and to make regeneration of the solution to a first or second solvent easier. Preferably, dilution is done to a concentration of at most 25 or 30 wt. %, because the precipitation would be too slow and the yield of cellulose type II crystals will be lower at higher concentrations. Sufficient time of typically at least 10 minutes should be taken to allow the type II crystals to precipitate. The cellulose nanocrystals can be separated from the solution by filtration or centrifugation and followed by washing with (deionized) water to remove $ZnCl_2$.

The virgin cellulose is preferably derived from bio-based materials. Bio-based material may contain apart from virgin cellulose also lignin and/or hemi-cellulose. The lignin and/or hemi-cellulose may be removed and separated from the virgin cellulose before the process of the invention, but it is also possible that the starting material used in the method is a bio-based material containing apart from virgin cellulose also lignin and/or hemi-cellulose. In that case in step B amorphous cellulose and optional hemicellulose is dissolved, in separation step C the dissolved amorphous cellulose and optional hemicellulose is separated from the phase comprising micro- or nanocellulose cellulose and lignin, for example by filtration. Lignin is substantially insoluble in aqueous $ZnCl_2$ solvent and is separated in step C as solid together with the obtained solid micro- or nanocellulose having XRD type I structure.

If the objective is to produce pure micro- or nanocellulose having XRD type I structure, the lignin can be separated from the obtained cellulose. Thus, in an optional step H the crystalline cellulose and lignin are treated with a solvent wherein lignin is dissolved and wherein the crystalline cellulose phase is not dissolved, and the dissolved lignin is separated from the solid crystalline cellulose phase. The crystalline cellulose can then be treated as described above. Suitable solvents to dissolve the lignin are a basic solvent or an organic solvent known in the art, preferably a basic solvent is used comprising KOH or NAOH in water. However, the lignin can also remain in the obtained cellulose for example to produce a lignin-cellulose XRD type I composite material as described below or in case a subsequent step D is done as described below.

Nano-cellulose having XRD type II cellulose with high crystallinity and purity can be obtained from biomass which contains virgin cellulose and lignin and optional hemicellulose in a method as described above comprising after step C, a step D wherein the crystalline cellulose and lignin are contacted with the second solvent to produce delaminated crystalline cellulose. The step D results in a clear solution of delaminated nano cellulose crystals such that the undissolved lignin can be separated from the solution comprising the nano cellulose crystals. In optional step G the lignin can be separated from the delaminated crystalline cellulose preferably by centrifugation and/or filtration.

In the method, the first and second solvent used in step A and step D, are preferably regenerated by removing impurities and/or diluent and recycling the regenerated solvent into the process. It is a particular advantage of the process to use Zinc chloride in both steps in different strengths, such that both the first and second solution can be easily regenerated in the same regeneration step.

The invention also relates to a micro- or nanocrystalline cellulose containing product P1 obtainable by any of the embodiments of the invention described above having an XRD type I crystal structure, an XRD crystallinity of at least 85%, preferably at least 90% and a (poly-)sugar content less than 10 wt. %, preferably less than 5 wt. %, more preferably less than 2 wt. % and preferably having a degree of polymerisation DP of at least 200 and an aspect ratio of less than 10.

The invention also relates to a nano-crystalline cellulose containing product P2 obtainable by any of the embodiments of the invention described above having an XRD type II structure, an XRD crystallinity of at least 80%, preferably at least 85% and more preferably at least 90% and a (poly-)sugar content less than 15 wt. % preferably less than 10 wt. %, more preferably less than 5 wt. % and most preferably more preferably less than 2 wt. % and preferably having a degree of polymerisation DP of 100-200 and an aspect ratio of at least 20. It is noted that the crystallinity values of type I and type II crystals cannot be compared. Crystallinity of type II can be found to be lower than that of type I because the type II product may comprise very small crystals that escape XRD detection.

The invention also relates to a cellulose composition comprising a mixture of micro- or nano crystalline cellulose having type I structure and nano crystalline cellulose having type II structure obtained by the method of the invention having high crystallinity and purity, wherein preferably the mixture is obtained by method A comprising mixing micro- or nanocrystalline cellulose having XRD type I structure, preferably obtained by the method according to the invention comprising steps A, B and C as described above, with nanocrystalline cellulose having XRD type II structure as obtained in the method described above comprising step D. Alternatively, the mixture is obtained by a method B according to the invention comprising steps A, B, C and D as described above wherein in step D a partial conversion is done from cellulose having XRD Type I structure to cellulose having XRD Type II structure wherein partial conversion is preferably done by choosing, a lower temperature or a shorter contacting time before adding anti-solvent or combinations thereof. A $ZnCl_2$ concentration lower than about 65 wt. % is not preferred as this will not result in type II conversion.

Optionally, the cellulose composition additionally comprises lignin. The lignin can be mixed separately with the above described XRD type I cellulose and XRD type II cellulose or, when starting from a biobased material comprising lignin as described above, by not or not fully separating the lignin from the type I and/or type II product method s described above.

The invention also relates to the use of the high crystallinity and high purity micro- or nano cellulose having XRD type I structure of the invention, the high crystalline and high purity nanocellulose having XRD type II structure of the invention or of the cellulose composition of the invention comprising the mixture of both as a coating material, filler or as material for the manufacture of cellulose shaped products, preferably fibers or films which are preferably used for the manufacture of packaging film, yarns, fabrics or as starting material for preparation of Carbon fibers.

BRIEF DESCRIPTION OF THE DRAWINGS

The features and advantages of the invention will be appreciated upon reference to the following drawings, in which.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention. The invention is further illustrated by the following examples.

EXPERIMENTAL METHODS

Measurement of XRD Crystal Type

The cellulose products obtained in the experiments are characterised using XRD. XRD measurements according to the method described by: Z. Man, N. Muhammand, A. Sarwono, M. A. Bustam, M. Vignesh Kumar, S. Rafiq in J. Polym. Environ 19 (2011) 726-731: Preparation of cellulose nanocrystals using an Ionic liquid. The crystal type I or II was identified by peak positions, which are for type I on 2θ of 22.6° (the [200] reflection) and for type 11 on 2θ of 20° and 22° (the [110] and [020] reflection)

Measurement of XRD Crystallinity

The product crystallinity (mentioned in the above document as crystallinity index) was determined using Segal's formula: $CrI=(I_{002}-I_{am})/I_{002}$ wherein 1002 is the overall intensity of the peak at 2θ of 22.6° for type I or 22° for type II cellulose and $I_{am}$ is the intensity of the baseline at 2θ about 18°.

Measurement of XRD Crystal Size

The cellulose crystal size was determined from the measured XRD using the Scherrer's equation:

$$\beta = \frac{0.9\lambda}{\tau \cos\theta}$$

wherein β is the crystallite sizes, Δ is the wavelength of incident X-rays, T is the full width at half maximum (FWHM) of the XRD peaks, θ is the diffraction angles corresponding to the planes.

Measurement of Cellulose Product Yield and Cellulose Hydrolyzation

Soluble (poly-)sugars were measured based on mass balance % of (poly-)sugars=$1-M^{prec}_{cel}/M^{in}_{cel}$ wherein $M^{prec}_{cel}$ is the weight of dry micro- or nanocellulose obtained in the experiment and Mince, is the weight of dry cellulose placed in the reactor. The term (poly-) sugars implies sugars and poly-sugars such as oligomer sugars. The drying of the obtained cellulose product is done according to the NREL lab procedure, convection oven drying for biomass is performed at 45° C. for 24 h-48 h with regular (typically every 3 h) check of the weight until the dry biomass weight does not change more than 1 wt. % in one hour.

Materials Used

The cellulose base material in all the below described experiments is cotton linter Micro Crystalline Cellulose (MCC) ex-Sigma C6288. XRD characterization shows ±80% of XRD-I type. $ZnCl_2$ and ZnO were also received from Sigma.

DESCRIPTION OF EXPERIMENTS

Example 1 According to the Invention

Step 1

The first solvent was prepared by adding 0.5 g ZnO powder to 100 g 60 wt. % aqueous solution of $ZnCl_2$, the mixture was kept under stirring (120 rpm/min) at room temperature overnight. Remaining unreacted ZnO solids were removed from the solution by filtration. The resulting 100 g solvent was mixed with 5 g of the cotton liner cellulose under stirring (480 rpm/min) and kept under stirring for 30 min at room temperature. The obtained cellulose crystals were separated from the solution by filtration over a glass filter, washed 8 times with deionized water to remove $ZnCl_2$. The resulting product was a 20 wt. % suspension of cellulose microcrystals in water.

Before XRD measurement the product samples were dried by vacuum drying at room temperature. The XRD measurement shows a higher % Crystallinity XRD-I material (>85%) compared to the initial cellulose (80%).

The amount of (poly-)sugars was evaluated by additional water washing of cellulose XRD-I material. Hardly any (<5 wt. %) of (poly-)sugars are present in the sample which is desired as these (poly-)sugars can and will degrade during further processing.

Step 2

The second solvent used in step 2 was prepared by mixing 0.5 g ZnO powder with 100 g 65% aqueous solution of $ZnCl_2$ and kept under stirring at room temperature overnight. Remaining solids were removed from the solution by filtration. The 100 g liquid was mixed with 5 g XRD-I phase material and stirred for 30 min at room temperature till the solution became clear. 225 g deionized water was added under stirring to the solution to decrease $ZnCl_2$ concentration till 20 wt. % to precipitate the cellulose from the second solution. The sample was kept under stirring for 20 min to allow the cellulose nanocrystals to precipitate. The cellulose nanocrystals were separated from the solution by centrifugation (6000 rpm/min; 10 min), washed with deionized water till no $ZnCl_2$ traces and stored as 20 wt. % suspension of nanocellulose in water.

Before XRD measurement the samples were dried by vacuum drying at room temperature overnight. The XRD measurement shows that the cellulose XRD-I phase is converted to cellulose XRD-II phase. The resulting crystallinity % is above 80%, less than 5 wt. % (poly-)sugars are formed. In a second step XRD-I phase material from step 1 is converted into XRD-II by treating with 65% $ZnCl_2$ solvent. The yield of the high crystallinity type II cellulose is about 75-80% of the virgin cellulose.

Example 2. The procedure is the same as in Example 1 but with both steps 1 and 2 performed at a higher temperature of T=70° C. The higher T results in shorter treatment time. At 70° C. the treatment time in both step I and II is reduced to 15 min without substantial changes in crystallinity of the resulting products. Also at 70° C. step 1 resulted in type I cellulose and step 2 resulted in type II cellulose crystals.

Example 3. The procedure is the same as in Example 1 but one of the steps 1 or 2 is performed at elevated T-70° C. The higher T results in shorter treatment time—at 70° C. the treatment time is reduced to 15 min without substantial changes in crystallinity of the resulting products.

Example 4. The procedure is the same as in Example 2 but at step 1 and step 2 the amount of cellulose and cellulose XRD-I was 8 g. It resulted in higher viscosity of the mixture and longer treatment time (30 min) without substantial changes in crystallinity of the resulting products.

A high cellulose concentration (more than 10 wt. % in step 1 and more than 8 wt. % in step 2) was not preferred because the solution viscosity becomes too high for this experimental set-up to get good mixing and separation. Further, it was found that below 62.5 wt. % $ZnCl_2$ concentration only a very small amount of cellulose is dissolved, below 60 wt. % almost no dissolution is observed and above 62.5-65 wt. % $ZnCl_2$ concentration dissolution is measurable in 30 min time. At a $ZnCl_2$ concentration above 75 wt. % the solvent is already becoming so viscous that in this experimental set-up it is difficult to mix and dissolve cellulose in reasonable amounts.

Comparative Experiment A (in Accordance with Example 5 in Prior Art CN102433786)

The process for the production of Nanocellulose comprises the following steps; adding 20 g of a solution of 70% $ZnCl_2$ in water to 1 g of cotton linter Micro Crystalline Cellulose (MCC) ex-Sigma C6288, putting into a basket mill for 180 min, subsequently add 50 g water to the cellulose/$ZnCl_2$ mixture to a final $ZnCl_2$ concentration of 20 wt. % to precipitate cellulose, then centrifuging the resulting mixture (centrifugation speed: 4000 rpm, 15 min), remove the upper layer solution and separating the lower layer of cellulose jelly to obtain the nano cellulose.

Comparative Experiment B (in Accordance with Example 5 in Prior Art CN102093484)

This comparative experiment the process for the production of Nanocellulose comprises the following steps; Add 5 g of the abovementioned cotton linter to 150 g of 65% $ZnCl_2$ in water, heat the mixture in an oil bath at 90° C. for 1 h and homogenize at high speed (at 12000 rev/min) to obtain transparent cellulose/$ZnCl_2$ solution. Then add 450 ml of 0.5% hydrochloric acid to the cellulose/$ZnCl_2$ solution to precipitate cellulose, and separate the layers by centrifugation, remove the upper layer of $ZnCl_2$ and the acid solution, centrifuge the lower layer of cellulose gum for 8 times with water, wetted ball milling of the lower layer for 5 hours to produce the nanocrystalline cellulose.

The obtained nano cellulose in the comparative experiments A and B is characterised using XRD It can be observed that a transition has occurred of the XRD-I structure of the cotton linter to XRD-II crystal structure. The product crystallinity is between 40 and 50%. The resulting product comprised (poly-)sugars in substantial amounts ranging between 10 and 25 wt. %.

Comparative Experiment C (in Accordance with Prior Art WO2017055407)

A solvent was prepared in the following way: 0.5 g ZnO powder was added to 100 g 70 wt. % aqueous solution of $ZnCl_2$, the mixture was kept under stirring (120 rpm/min) at room temperature overnight. Remaining solids were removed from the solution by filtration. 100 g of the resulting solvent was mixed with 5 g cotton liner cellulose under stirring (480 rpm/min) and kept under stirring for 30 min at room temperature till the solution became clear. Then 250 g of deionized water was added under stirring to the solution. The sample was kept under stirring for 20 min to allow the cellulose nanocrystals to precipitate. The cellulose nanocrystals were separated from the solution centrifugation (6000 rpm/min; 10 min), washed 8 times with deionized water to remove $ZnCl_2$. The resulting product was a 20 wt. % suspension of nanocellulose in water.

Before XRD measurement the samples were dried by vacuum drying at room temperature. The XRD measurement shows a transition of the XRD-I to XRD-II crystal structure. The resulting crystallinity ranges between 50 and 70%. Less than 10 wt. % of the cotton liner weight has converted to of (poly-)sugars. The yield of the relatively low crystallinity type II cellulose is about 75-80% of the virgin cellulose.

Comparative Experiment D

Comparative experiment D was done in accordance with prior art by Xiao Yun Tan, Sharifah Bee Abd Hamid, Chin Wei Lai in Biomass and Bioenergy 81 (2015) 584-591; Preparation of high crystallinity cellulose nanocrystals (CNCs) by ionic liquid solvolysis".

In the experiment pure 1-butyl-3-methylimidazolium hydrogen sulfate (BmimHSO4) is used as solvolysis catalyst and as solvent. The experiment comprises the steps of adding a mass fraction of 10% Cotton linter into BmimHSO4 with vigorous stirring, heating at 90° C. respectively for 1.5 h on a magnetic hot plate stirrer followed by quenching by adding 20 cm of cold deionized water to the reaction mixture. After off-white precipitates of cellulose formed the mixture is sonicated at room temperature for 15 min and the suspension is washed with deionized water using repeated centrifugation to isolate the nanocrystalline cellulose. The precipitates were freeze dried and kept in 4° C. refrigerator before use.

The XRD measurement showed type I crystals having an XRD-I Crystallinity of 85%. Hardly any (<10%) of polysugars (oligomers) and sugars are formed.

It was found that it is not possible in BmimHSO4 solvent to convert the type I cellulose crystals to type II cellulose crystals. The BmimHSO4 solvent is already undiluted and raising the temperature to 120 and 140° C. resulted in brown colour, probably resulting from degradation.

What is claimed is:
1. A method for the preparation of micro- or nano crystalline cellulose from a virgin cellulose containing an amorphous cellulose phase and a crystalline cellulose phase, the method comprising the steps of:
(A) contacting virgin cellulose with a first solvent, characterized in that the first solvent is an aqueous solution comprising 40-65 wt. % ZnCl$_2$ in water, relative to the total weight of the ZnCl$_2$ and water,
(B) dissolving the amorphous cellulosic phase, whereby the amorphous cellulose phase is preferentially dissolved over the crystalline cellulose phase, wherein the temperature in step A and B is below 80° C. and,
(C) separating the dissolved amorphous cellulose from the crystalline cellulose, wherein the crystalline cellulose obtained in step B comprises cellulose having an XRD type I structure.

2. The method according to claim 1, wherein the temperature in step A and B is below 70° C.

3. The method according to claim 1 wherein the first solvent is free of a proton acid.

4. The method according to claim 1, wherein the first solvent is free of a proton acid and comprises as proton scavenger ZnO or Zn(OH)$_2$.

5. The method according to claim 1, wherein the crystalline cellulose obtained in step B or C has a higher XRD crystallinity then the virgin cellulose material.

6. The method according to claim 1, further comprising a step E wherein a coagulation agent is added to the dissolved amorphous cellulose obtained in step C to precipitate the amorphous cellulose.

7. The method according to claim 1 further comprising a step D wherein the crystalline cellulose obtained in step C is contacted with a second solvent to produce delaminated cellulose, wherein the second solvent comprises between 65 and 90 wt. %, ZnCl$_2$ in water.

8. The method according to claim 7, wherein the delaminated cellulose obtained in step D comprises cellulose having an XRD type II structure.

9. The method according to claim 1, wherein the virgin cellulose is in a biomass which contains virgin cellulose and lignin and optionally hemi-cellulose and
  a) in step B the amorphous cellulose and optional hemicellulose is dissolved in the first solvent, wherein
  b) in separation step C the dissolved amorphous cellulose and optional hemicellulose is separated from the crystalline cellulose and lignin and wherein
  c) optionally in a step H the crystalline cellulose and lignin is treated with a solvent, wherein lignin is dissolved and wherein the crystalline cellulose phase is not dissolved and the dissolved lignin is separated from the crystalline cellulose.

10. The method according to claim 7, wherein the virgin cellulose is in a biomass which contains virgin cellulose and lignin and optional hemi-cellulose, wherein
  in step B amorphous cellulose and optional hemicellulose is dissolved in the first solvent, wherein
  in separation step C the dissolved amorphous cellulose and optional hemicellulose is separated from the crystalline cellulose and lignin and wherein
  in a step D the crystalline cellulose and lignin are contacted with the second solvent to produce delaminated crystalline cellulose and wherein
  optionally in a step G the lignin is separated from the delaminated crystalline cellulose.

11. A micro- or nanocrystalline cellulose containing product P1 obtained by the method of claim 1 having an XRD type I structure, an XRD crystallinity of at least 85%, and a (poly-) sugar content less than 10 wt. %; or containing product P2 obtained by the method of claim 7 having an XRD type II structure, an XRD crystallinity of at least 80%, and a (poly-) sugar content less than 15 wt. %; or a mixture of product P1 and P2.

12. The cellulose composition of claim 11, further comprising lignin.

13. A method for the preparation of a coating material, filler, or as a material for the manufacture of cellulose shaped products using the micro- or nanocellulose having XRD type I structure of claim 11 or of the nano cellulose having XRD type II structure of claim 11 or of the cellulose composition of claim 12.

14. The method according claim 5, wherein the crystalline cellulose obtained in step B or C has a higher XRD crystallinity then the virgin cellulose material, wherein the XRD crystallinity of the obtained crystalline cellulose is at least 10% higher than of the virgin cellulose and the XRD crystallinity of the obtained crystalline cellulose is at least 85%.

15. The method according to claim 6, wherein the coagulation agent of Step E is an anti-solvent being one or more chosen from the group consisting of C1 to C8 alcohol, ketones, or water.

16. The method according to claim 7, wherein the second solvent comprises a proton scavenger.

17. The method according to claim 7, wherein the proton scavenger is ZnO or Zn(OH)$_2$.

18. Nano-crystalline cellulose containing product P2 of claim 11 having a (poly-) sugar content less than 5 wt. %.

19. The method according to claim 13 wherein the cellulose shaped products are cellulose shaped fibers or films.

* * * * *